United States Patent [19]

Mudryk, Jr. et al.

[11] Patent Number: 5,754,823
[45] Date of Patent: May 19, 1998

[54] CONFIGURABLE I/O SYSTEM USING LOGIC STATE ARRAYS

[75] Inventors: John S. Mudryk, Jr., Cary; Steven S. Yauch, Raleigh, both of N.C.; Richard R. Lyman, Los Gatos, Calif.

[73] Assignee: Datalogic, Inc., Scotts Valley, Calif.

[21] Appl. No.: 393,935

[22] Filed: Feb. 23, 1995

[51] Int. Cl.⁶ .............. G06F 3/00; H04Q 3/00; G05B 19/045

[52] U.S. Cl. ............. 395/500; 326/126; 326/38; 326/41; 326/125; 340/825.79; 340/825.03; 340/825.87; 364/489; 364/716

[58] Field of Search .............. 395/500, 22, 21, 395/375; 326/98, 21, 119, 41, 16, 38, 44, 47, 40, 126, 125, 75; 371/22.3, 22.6, 62; 340/825.84, 825.79, 825.03, 825.5, 825.87; 364/578, 490, 488, 489, 716; 365/185.28, 189.08, 230.03, 201, 94; 327/17, 37

[56] References Cited

U.S. PATENT DOCUMENTS

| Re. 34,363 | 8/1993 | Freeman | 236/38 |
|---|---|---|---|
| 4,566,064 | 1/1986 | Whitaker | 395/375 |
| 4,680,486 | 7/1987 | Price et al. | 326/126 |
| 4,748,348 | 5/1988 | Thong | 327/17 |
| 5,001,368 | 3/1991 | Cliff et al. | 326/40 |
| 5,021,689 | 6/1991 | Pickett et al. | 365/185.28 |
| 5,321,828 | 6/1994 | Phillips et al. | 395/500 |
| 5,389,835 | 2/1995 | Yetter | 326/119 |

*Primary Examiner*—Jacques Louis-Jacques
*Attorney, Agent, or Firm*—Patrick T. King

[57] ABSTRACT

A configurable I/O arrangement for a controller has a number of internal and external input/output terminals, each of which are field selected as either an input or an output terminal. Logic functions of the controller are configured for a number of output terminals using up to 32 internal logical states and the states of 32 external physical I/O points. The update timing for each logic circuit is selectable to be synchronized in several different ways: synchronous with an internal event within the controller, synchronous with an event external to the controller, and asynchronous. The I/O arrangement includes a combination of a synchronous latchable input state array, user configurable means for logically combining the output signals of the reading circuits, and means for actuating external devices as a function of the logical combinations of the output signals of the reading circuits.

14 Claims, 8 Drawing Sheets

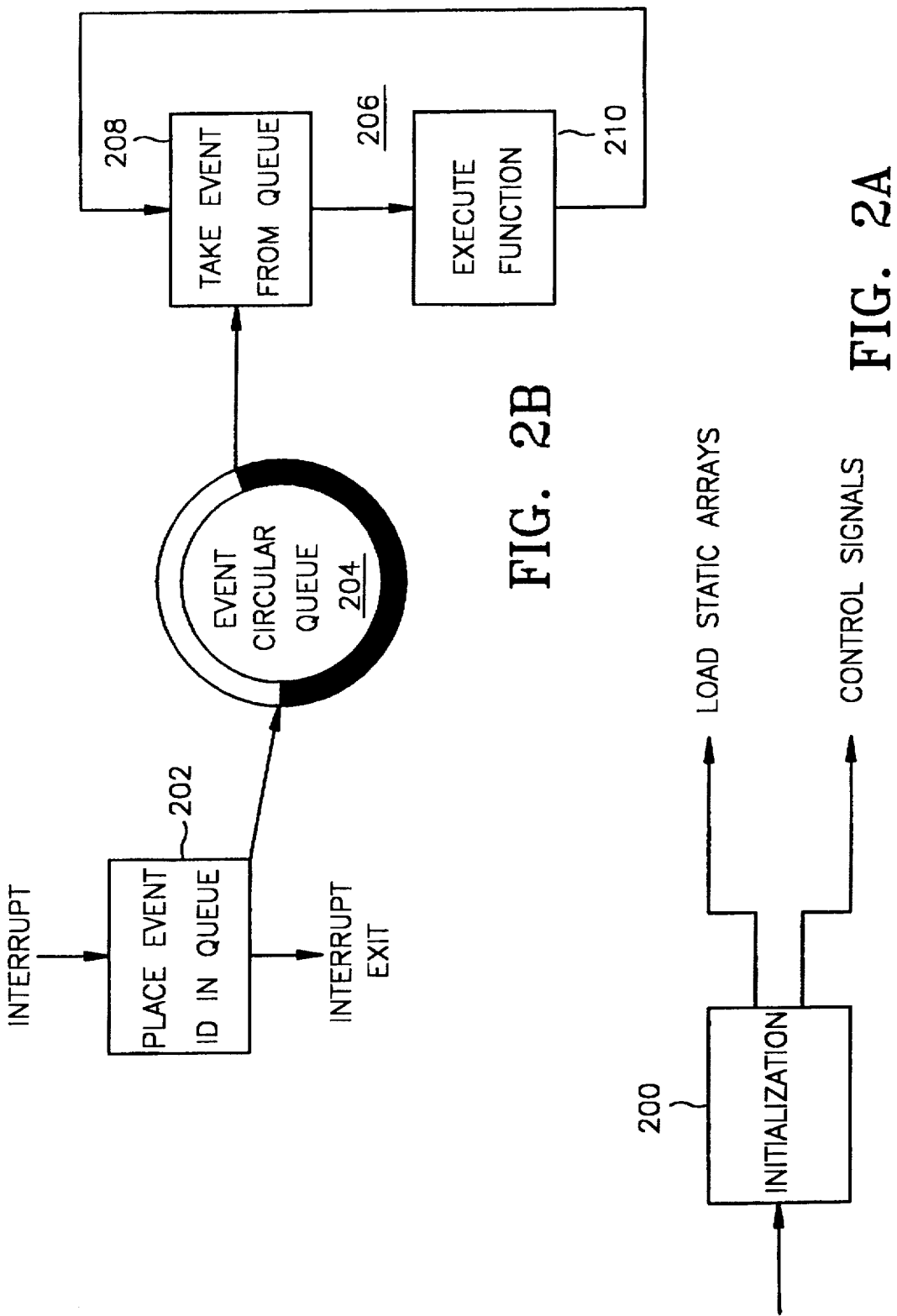

INTERRUPT DRIVER EVENT QUEUE

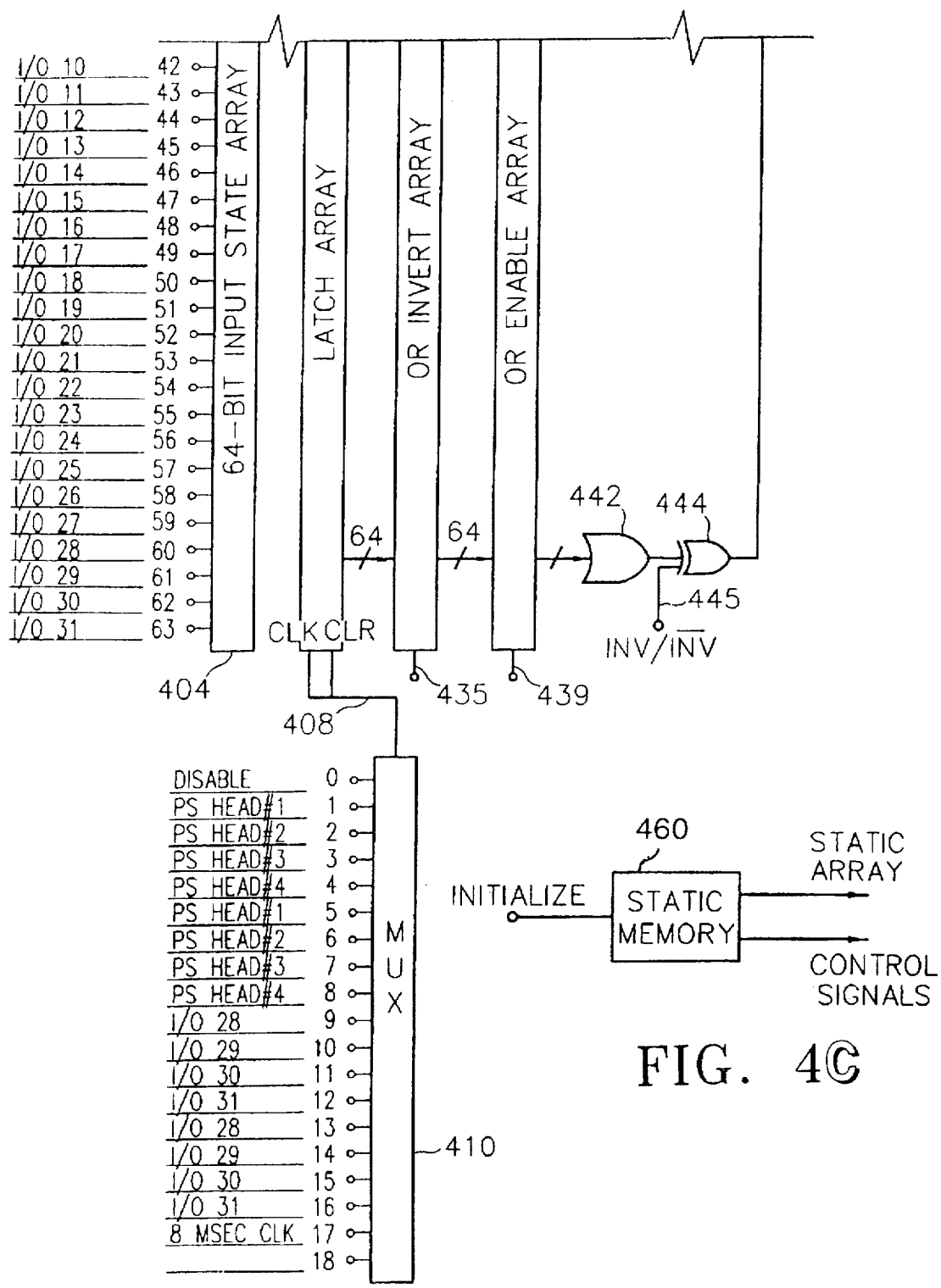

CONFIGURABLE I/O SYSTEM USING LOGIC STATE ARRAYS

TECHNICAL FIELD

The present invention relates generally to user-configurable logic configurations, and more particularly, controllers used with bar code decoders and verifiers.

BACKGROUND OF THE INVENTION

A controller is an electronic device which provides control functions for an external device in response to input signals. A controller provides one or more output control or command signals to the external device in response to one or more input signals. Controllers are used, for example, in industrial packaging applications in the pharmaceutical, cosmetic, beverage, and other industries.

Programmed Logic Controllers (PLCs) use programmed logic devices to implement a controller function. The logic functions of a PLC are executed at a fixed scan rate, which is asynchronous to any input signal. Logic functions implemented in the PLC internal program incur a latency equal to the scan period. This slows down the response time and results in the output signals of the PLC not being synchronized with external events. PLCs operate asynchronously so that their output signals are not synchronized with either internal or external events.

Alternatively, control functions are implemented with "hardware" logic. Hardware logic is programmed, for example, by physically wiring devices together, blowing fuses, or programming non-volatile memory devices. Hardware logic is not easily or quickly reconfigured or reprogrammed.

Consequently, a need exists for a controller which is easily reprogrammed and which also provides synchronized output signals.

SUMMARY OF THE INVENTION

It is, therefore, an object of the present invention to provide a controller which has a configurable I/O arrangement and which provides flexibility in the utilization of a number of external physical input/output points, or terminals. Each individual I/O point, or output terminal of the controller, can be field selected as either an input or an output terminal. In one embodiment of the invention, the logic functions of the controller are configured for each output terminal using up to 32 internal logical states and the states of 32 external physical I/O points.

The update timing for each logic circuit in a controller with a configurable I/O arrangement according to the invention is selectable to be synchronized in several different ways. One way is to synchronize with an internal event which is provided to an input state array within the controller. Another way is to synchronize with an event which is external to the controller. Alternatively, asynchronous update timing can be provided, if desired.

The invention includes a combination of reading circuits, user configurable means for logically combining the output signals of the reading circuits, signal conditioning means for combining the outputs of reading signals and intermediate signals resulting from other signal conditioning means, an update trigger means for supplying update trigger signals to the configurable means and signal conditioning means, and means for actuating external devices as a function of the logical combinations of the output signals of the reading circuits. A presence detector, which detects, for example, the presence of a bar code, can be used to trigger the system.

A controller having a configurable I/O system according to the invention includes means for initializing the system; means for detecting an input event; means for placing the input event in a circular event queue; functional dispatch means for removing the input event from the circular event queue; and means for executing a predetermined function in response to the input event. The functional dispatch means includes means for mapping the event through a table to a combinatorial logic calculation routine and includes means for initiating execution of a combinatorial logic routine.

Inputs to the state array are looked for at the end of a gate period provided by a trigger event.

The means for executing a predetermined function in response to the event includes: means for providing state variables representing input values; and means for operating on the state variables to produce output states. The predetermined function is a software simulation of a programmable array. The programmable array is an array of AND/OR gates by means of which outputs can be specified as logical functions of the inputs. The state variable inputs consist of external signals, internally generated states, counter states, shift register states, and latch states.

In specific embodiments of the invention, the external signals include a signal which is generated from an "item" presence sensor, which detects, for example, the presence of a bar code. The presence sensor provides an "event gate" time during which one of the main functions of the controller can be initiated. The signal which is generated from the presence sensor includes, for example, a signal generated when an item is in front of an infrared light beam.

According to another aspect of the invention, a configurable I/O system includes an input state array; a trigger function; logic functions; and an output signal conditioner. The trigger function is the means for synchronizing the logic functions with other external events or internal events within a control system. In contrast, a PLC does not provide for synchronization with external or internal events.

According to another aspect of the invention a configurable I/O system includes an input state array for receiving a plurality of input signals and having a plurality of elements respectively corresponding to one of said input signals A latch array has elements for receiving and storing the states of the elements of the input state array. Means are provided for selecting a clock signal provided to the latch array.

An AND logic sequence includes an AND inverter array having elements for receiving and selectively inverting the elements of the latch means; a multi-input AND array; an AND input selection array for directing a corresponding bit from the latch array into one of the inputs of the multi-input AND array; and an AND Output Inverter. An OR logic sequence includes an OR inverter array having elements for receiving and selectively inverting the elements of the latch means; a multi-input OR array; an OR input selection array for directing a corresponding bit from the latch array into one of the inputs of the multi-input OR array; and an OR Output Inverter. An OR gate combines the outputs of the AND Output Inverter and the OR Output Inverter.

According to another aspect of the invention, a configurable AND logic sequence for a configurable I/O system includes a first Exclusive OR array for logically combining each respective element of a state array with the respective element of an AND Invert array. A first AND array is provided for logically combining each respective elements of the first Exclusive OR array with each respective elements of an And enable array A first OR array logically combines the respective elements of the AND array into a single element. A first inverting Exclusive-OR invert Array combines the single element of the OR array with an invert command signal to provide an inverted or non-inverted AND output signal.

A configurable OR logic sequence for a configurable I/O system includes a second Exclusive OR array logically combining respective elements of the state array and an OR Invert array. A Second AND array logically combines respective elements of the second Exclusive OR array with respective elements of an OR enable array A second OR array logically combines the respective elements of the second AND array into a single element. A second inverting Exclusive-OR invert Array combines the single element of the OR array with an invert command signal to provide an inverted or non-inverted OR output signal.

An output OR Array logically combines the inverted or non-inverted AND output signal with the inverted or non-inverted OR output signal. The configurable I/O system further includes an output signal conditioner which alternatively provides direct channels to output terminals, shift registers, a pulse circuit, a latch circuit, and an internal counter.

In one specific embodiment of a configurable I/O system, the AND logic sequence and the OR logic sequences are the same. The difference between the AND sequence and the OR sequence is only in the sense of the INV/$\overline{INV}$ control to the inverting XOR gate and the sense of the control bits in the AND and OR Invert Arrays.

A method of providing a configurable I/O system, comprising the steps of: initializing the system; detecting an input event; placing the input event in a circular event queue; removing the input event from the circular event queue using a functional dispatch means; and executing a predetermined function in response to the input event. The method includes the step of mapping the event through a table to a combinatorial logic calculation routine and including the step of initiating execution of the combinatorial logic routine. The step of executing a predetermined function in response to the event includes the steps of providing state variables representing input values and operating on the state variables to produce output states. The step of executing a predetermined function in response to the input event includes the step of using a software simulation of a programmable array. The step of using a software simulation of a programmable array includes using a programmable array which is an array of AND/OR gates by means of which outputs can be specified as logical functions of the inputs. The input state variables consist of external signals, internally generated signals, counter states, shift register states, and latch states.

BRIEF DESCRIPTION OF THE DRAWINGS

The accompanying drawings which are incorporated in and form a part of this specification, illustrate embodiments of the invention and, together with the description, serve to explain the principles of the invention:

FIG. 2A is a functional block diagram illustrating initialization of a configurable I/O system according to the invention.

FIG. 2B is a functional block diagram illustrating a technique for providing a trigger function for a configurable I/O system according to the invention.

FIG. 4 is an overview showing the arrangement of the partial views FIGS. 4A and 4B.

FIGS. 4A–B are block diagrams of an input state array and a logic function.

FIG. 4C is a functional block diagram illustrating a static memory function according to the present invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
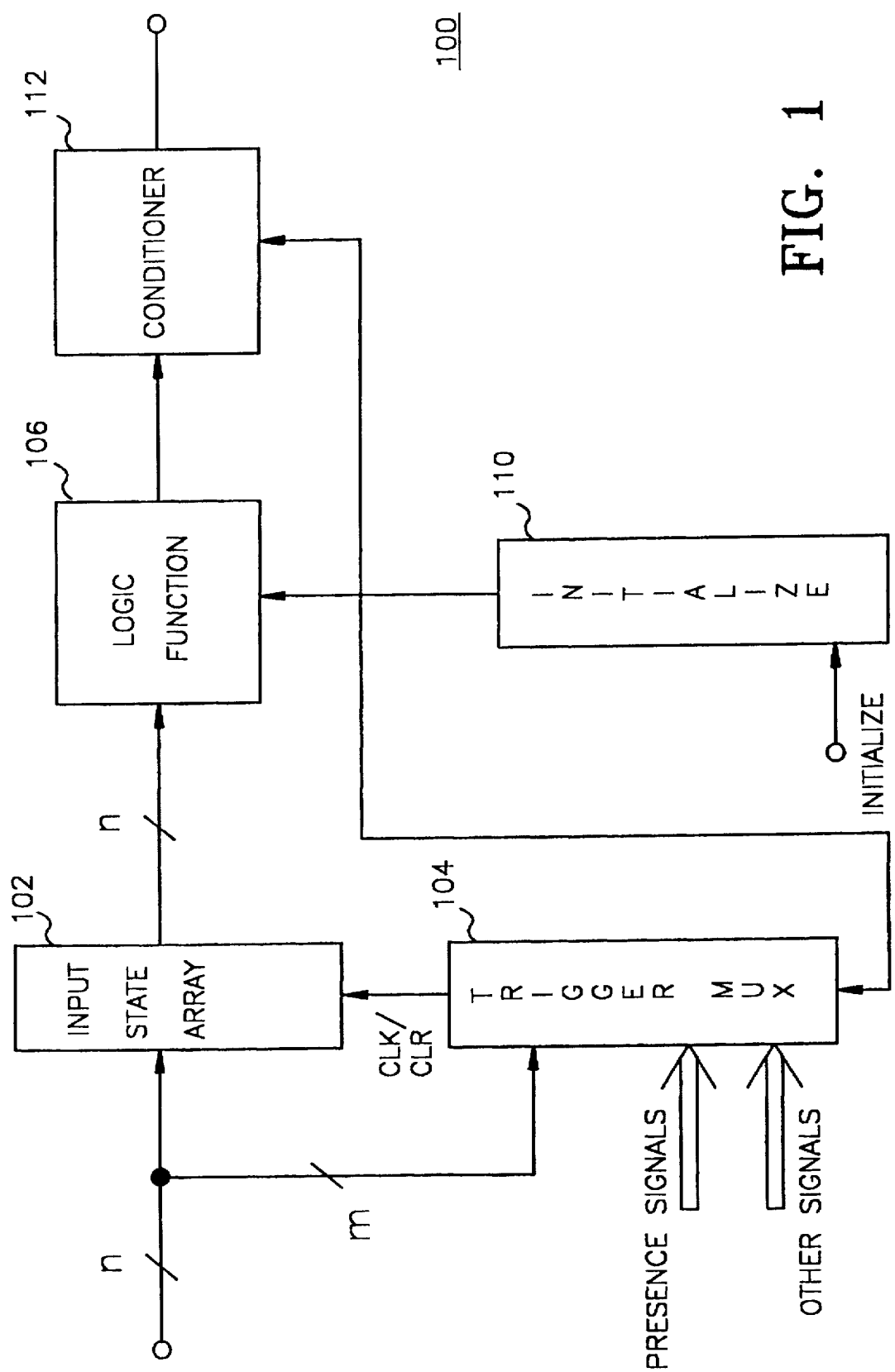
FIG. 1 is a block diagram of a generalized configurable I/O system which includes an input state array, a logic function, a trigger function, and an output signal conditioner.

FIG. 1 shows a block diagram showing the principle elements of a configurable I/O system 100, according to the invention. The configurable I/O system 100 includes an input state array 102 for receiving n input state variables.

A trigger function multiplexer 104 provides clock and clear signals to an output latch array, which is part of the input state array 102. The trigger function multiplexer 104 provides one of a number of preselected signals to trigger the latch array of the input state array 102. The trigger function multiplexer 104 receives inputs from a number of sources, including: m input state variables, presence signals indicating the presence of an item, and other signals such as periodic clock pulses and a disable signal. In this manner the input state variables are latched and provided at a precise time to a configurable logic function 106 for execution of the logic function 106 in synchronization with the selected input of the trigger function multiplexer 104.

The output of the logic function is then provided to an output signal conditioner 112.

Initialization of the logic function, the signal conditioner 112, and the trigger multiplexer 104 is provided by an initialization function block 110. The initialization function 110 allows a user to select, for example, which of the n input state variables are to be operated upon by the logic function 106.

The initialization function 110 also allows a user to select the configuration of the logic function 106, for example, as a simulated combinatorial AND/OR logic function. The initialization function permits inversion and enablement of preselected input state variables as well as of various intermediate and final state variables for the logic function.

The initialization function 110 further allows a user to select further signal conditioning functions for the output of the logic function 106. Further signal conditioning may alternatively include, for example, connecting output signals to a counter, an output terminal, shift registers, a pulse circuit, a latch circuit, or another internal counter.

FIG. 2A shows an initialization module 200 which initializes the system. The initialization module 200 includes a static memory. The initialization module 200 provides outputs for static logic arrays and provides control signals or states to logic elements. The initialization module 200 is activated by an initialization command to load the appropriate arrays and to initiate operation of the system. The initiation module is a program block which sets up the connections between the various system modules. The connections are kept in a list of functional block addresses to call upon event triggers.

FIG. 2B is a functional block diagram illustrating the program steps which provide a trigger to initiate execution of a function for a configurable I/O system according to the invention. An event detector module 202 detects an interrupt event caused by a change in an input signal. The event detector module 202 detects these events which are be used as triggers and also detects timer interrupts. Upon detecting an event, that event is placed into a circular event queue 204. The event queue 204 isolates the event detection interrupts from slower event processing operations. This provides a system with a high event burst rate rating.

A functional dispatcher module 206 initiates execution of a functional logic block by having a module 208 take an event from the event queue 204 at an appropriate time, as determined by the length of delay provided by the event queue 204. An execute function module 210 simulates a configurable logic function for the configurable I/O system.

The system is optimized to operate in real-time and to satisfy two important real-time constraints: namely, to maximize the rate of acquisition of the changes in the inputs and to maximize the average processing rate of the elements of the configurable system, which includes combinatorial logic and signal conditioners, such as shift registers, latches and counters.

The function dispatcher modules 206 removes events from the event queue 204 and executes an appropriate functional block in module 210. For example, it may be desired that a certain input variable change to trigger a particular configurable I/O combinatorial logic calculation required to produce a certain output control bit. When the input variable changes, an event identifier is placed in the event queue 204. The function dispatcher module 206 removes the event identifier, maps the event through a table to the combinatorial logic calculation routine, and then initiates execution of the combinatorial logic routine in the execute module 210. The function dispatcher 206 continues to take events out of the queue 204 and to execute functional blocks until the event queue 204 is empty.

After being called by the functional dispatcher, the function triggered by an I/O event is executed. The execution functions provided by the execute module 210 take all of the input state variables, operate upon them, and produce output states. An example of a particular execute function is an AND/OR logic function shown herein below in connection with FIG. 5.

Figure 3A:
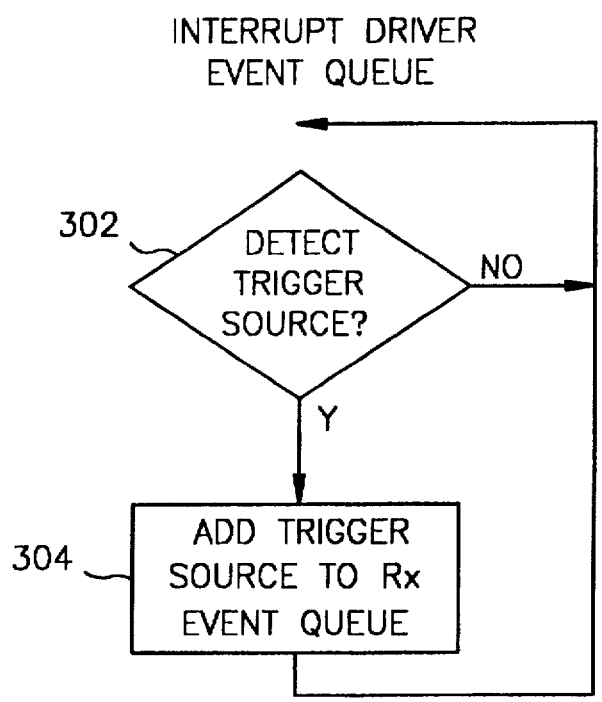
FIG. 3A is a flow chart illustrating detection of a trigger event and add the trigger event to a circular event queue.

FIG. 3A is a flow chart illustrating the steps to detect a trigger event and to add the trigger event to the circular event queue 204. An element 302 detects an appropriate trigger source and an element 304 adds an event to the event queue 204.

Figure 3B:
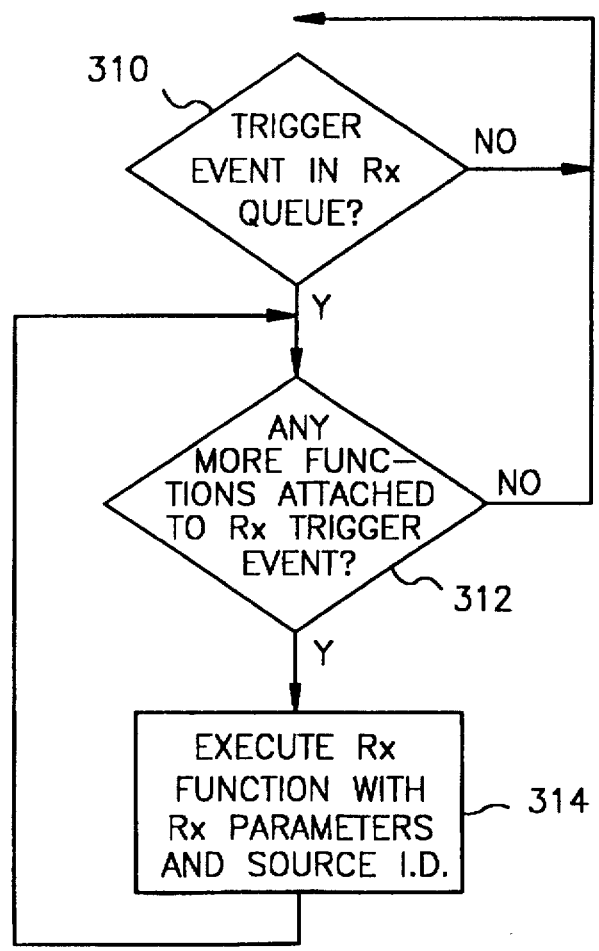
FIG. 3B is a flow chart illustrating the taking of a trigger event from the circular event queue and executing logical functions.

FIG. 3B is a flow chart illustrating the steps to take a trigger event from the circular event queue and execute functions. An element 310 triggers the event logged into the queue 204. The element 312 determines whether additional functions are attached to the trigger event in the queue 204 and if so they are executed as indicated by the element 314. Elements 312 and 314 continue to function until all functions attached to the received trigger event are completed.

FIG. 4C shows a static memory 460 including an initialization module. The initialization module provides outputs for static state logic arrays and control signals to logic elements. The static memory is activated by an initialization command to load the appropriate arrays into the initialization module and to initiate the operation of the system. The initialization module is a program block included in the static memory for setting up the connections between the various system modules.

Figure 4A:
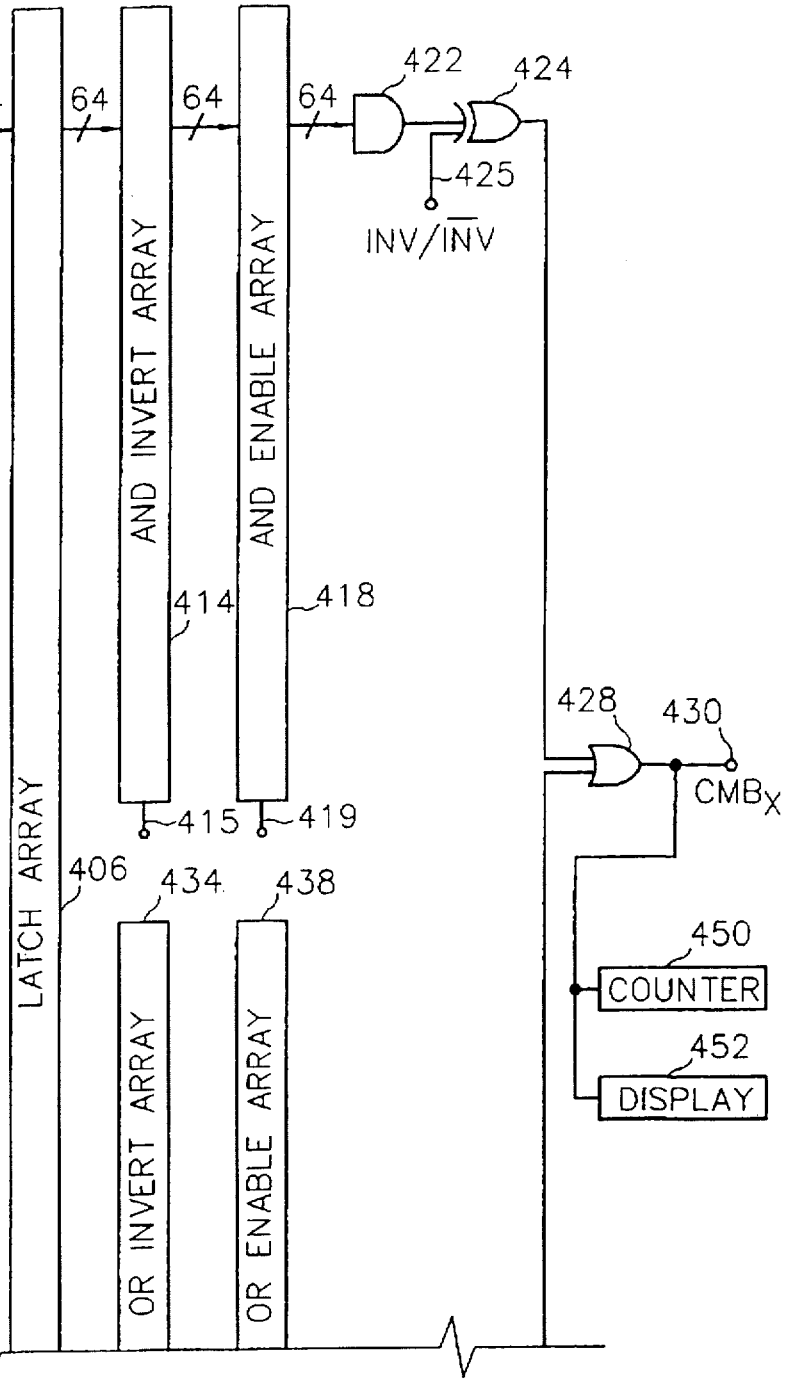

FIGS. 4A–4B are functional block diagrams which illustrate an input state array, a trigger function, and a logic function for a configurable I/O system module 400, according to the invention. A complete configurable I/O system contains, for example, 32 such modules. The I/O system module 400 combines the input state module 102, the trigger module 104, and the logic function module 106 of FIG. 1. While the invention is described in terms of various arrays and logic elements, one preferred embodiment of the invention is implemented using various software arrays, logic functions, and interconnecting paths as provided in a conventional programmed personal computer, work station, or similar system.

Each I/O system module includes a 64-bit input state array 404 having 64 input signals (0–63). The 64-bit input state array 404 receives signals from various sources such as bar code decoders. The 64 outputs of the 64-bit input state array are connected to the input terminals of a 64-bit input latch array 406. The input latch array 406 receives clock signals on a signal line 408 from the output terminal of a multiplexer 410. The 64 bit input array does not receive interrupts or note transitions per se. The 64 bit input array always contains the latest/most up-to-date state of all of the inputs. The MUX 410 detects transitions and routes them to the appropriate Latch Arrays. Transition of the state array are subsequently processed by combinatorial logic. The outputs of the input latch 406 are provided to two subsequent parallel combinatorial logic paths: one path provides an AND function and the other path provides an OR function.

For the AND path, the output of the latch array 406 are provided as inputs to a 64-bit AND invert array 414. Configuration control states AND_INV are received by the 64-bit AND invert array on a 64-bit bus 415. The outputs of the AND invert array 414 are connected to respective inputs of an AND enable array 418. Configuration control signals AND_EN signals are received by the 64-bit AND invert array 418 on a 64-bit bus 419. The outputs of the AND enable array 418 are connected to the respective inputs of a 64-input AND gate array 422. The output of the 64-input AND gate array 422 is connected to one input terminal of an Exclusive-OR gate 424 which functions as a master inverting gate for the AND function. An INV/*INV signal is provided on a line 425 to the other input terminal of the Exclusive-OR gate 424. The output terminal of the exclusive-OR gate 424 is connected to one input terminal of an OR gate 428. The output terminal of the OR gate provides a CMBx signal, 430 where x corresponds to one of the 32 output terminals for a 32-bit system.

For the OR path, the output terminals of the input latch array 406 are also connected to respective inputs of a 64-bit OR invert array 434. Configuration control signals OR_INV signals are received by the 64-bit OR invert array on a 64-bit bus 435. The output terminals of the OR invert array are connected to respective inputs of an OR enable array 438. Configuration control signals OR_EN signals are received by the 64-bit OR invert array on a 64-bit bus 439. The outputs of the OR enable array 438 are connected to respective inputs of a 64-input OR gate 442. The output of the 64-input OR gate array 442 is connected to one input terminal of an exclusive-OR gate 444 which functions as a master inverting gate. An INV/*INV signal is provided on a signal line 445 to the other input terminal of the exclusive-OR gate 444. The output terminal of the exclusive-OR gate 444 is connected by a signal line to the other input terminal of the OR gate 428 where the OR gate 428 combines the outputs of the And and the OR channels to provide CMBx signals 430, where x corresponds to one of the 32 output terminals of a 32-bit system.

The 64-bit input state array 404 of the I/O system module 400 has terminals 0–31 which are always only input terminals. The input state array 404 includes a number of I/O terminals (numbered 32 through 63). All of these I/O terminals are input terminals unless otherwise programmed. Until configuration codes are loaded into the I/O system module 400, no output signals are provided at an output terminal for control of any external actions. Without configuration codes, the internal controller operations such as decoding of a bar code and matching of the bar code to a match code are performed but no output signal is provided at the output terminal. The results of the matching operation are only placed into the internal 64-bit input state array 404.

The 64-bit input state array 404 contains all of the input states that are subsequently made available to both the AND and OR combinatorial logic circuits for all of the I/O system module. The 32 I/O system modules therefore provide 32 outputs. Of the 64 input bits provided to the input terminals (0–63) to the 64-bit input state array, the 32 bits provided at terminals 0–31 are bits indicating the internal logical states of, for example, a bar code reader system, such as provided in connection with a PMC80 Series of printed-matter controllers provided by DataLogic, Inc. of Scotts Valley, Calif. The other 32 input bits provided at terminals 32–63 are associated with the external I/O points, or terminals.

The 32 internal logical states provided at terminals 0–31 include all of the internal states of, for example, the bar code reader system. The internal states provided by the bar code reader system are the results of operations performed by bar code readers. These basic results include: a status of the bar code reading and matching functions for each bar code scanner, a consecutive-error status for each scanner, a reject-verify-failure status for up to 8 I/O points, and a scanner-head-disabled status. The 32 external I/O terminals 32–63 of the state array provide the inputs to subsequent combinatorial logic circuits as well as feed-back/feed-forward connections to other outputs. The feed-forward feature provides the capability of performing more complex logic functions by cascading the logic functions.

Each logic internal status terminal 0–31 and each external input/output terminal 32–63 is assigned a bit position in the 64-bit input state array 404 which contains a total of 64 bits, or possible inputs. These 64 possible inputs are made available to subsequent AND or OR combinatorial logic.

In order to properly control the timing of the outputs generated by the combinatorial logic, an input latch is provided with a clock/clear signal provided on the signal line 408 from the multiplexer 410. This arrangement allows a programmer to synchronize the output of the configurable I/O system module with inspection events. Whenever the selected clock signal on signal line goes from false to true, the latest value in the input state array is presented to the input terminals of the AND and OR combinatorial logic circuits.

The clock signal to the input latch array 406 is enabled through the multiplexer 410, which provides for the selection of any of the four bar code presence signals in either the "true-to-false" or the "false-to-true" transition modes. External I/O points 28 thru 31 are also available as clocks to the Input Latch in the "true to false" and "false to true" transition.

The four bar code presence signals and 4 external I/O points are available as clock sources. A periodic internal clocking signal is also available which provides updates of the outputs similar to a PLC's scan cycle. This latch clock is used whenever it is desired to have constant/continuous update of the selected output according to the latest state of the bits in the input state array. This is the type of update that typically occurs with relay logic solving functions of programmable logic controllers.

The input latch passes the latest state of the input state array 404 to the combinatorial logic on the transition of the selected clock. The outputs of the latch are cleared, or set to "false," on the opposite edge of the selected clock. This guarantees that there will be transitions of the subsequent combinatorial logic from one inspection to the next.

Note that the clearing function does not occur when the periodic clock source is used.

Each enabled output must have an update control enabled for it. This update control selects which of a number of events will cause an update to the output. These events will be the periodic clock source or external inputs (clock inputs or presence inputs). The timers should be 2 milliseconds and 10 milliseconds. These will be selected by a numeric value in an array which defines the update event for each output. These will be:

| | |
|---|---|
| 0 | Disabled |
| 1 | Presence #1 false to true |
| 2 | Presence #2 false to true |
| 3 | Presence #3 false to true |
| 4 | Presence #4 false to true |
| 5 | Presence #1 true to false |
| 6 | Presence #2 true to false |
| 7 | Presence #3 true to false |
| 8 | Presence #4 true to false |
| 9 | Input 29 false to true |
| A | Input 29 false to true |
| B | Input 30 false to true |
| C | Input 31 false to true |
| D | Input 28 true to false |
| E | Input 29 true to false |
| F | Input 30 true to false |
| 10 | Input 31 true to false |
| 11 | 2 msec periodic clock source |
| 12 | 10 msec periodic clock source |

Each of the output terminals of the input latch array 406 are connected to the corresponding inputs of the AND invert array 414 and the OR invert array 434. These arrays each contain 64 bits, each of which correspond to a position in the input state array. Any particular bit position that is set to a "1" in the corresponding invert array causes the logic value from the state array to be inverted before going into an associated combinatorial logic gate.

The output terminals of the AND invert array 414 are connected to corresponding inputs of the AND enable array 418. The output terminals of the OR invert array 434 are connected to corresponding input terminals of the OR enable array 438. Each enable array contains 64 bits, each of which corresponds to a bit in the input state array. Setting a particular bit in one of the enable arrays directs the corresponding bit position from the corresponding input state array into the corresponding combinatorial logic gate. Enabling of an input is analogous to closing a switch in a circuit connecting an input state array bit to an input terminal of the corresponding combinatorial logic gate.

Each of the outputs of the AND enable array 418 are fed to a corresponding one of the 64 input terminals of the 64-input AND gate array 422. Each of the outputs of the OR enable array 438 is fed to a corresponding one of the 64 inputs of the 64-input OR gate array 444. All inputs to the AND gate that are not enabled are forced to TRUE (pulled-up). All inputs to the OR gate array that are not enabled are forced to FALSE (pulled-down).

The output of the AND gate array 422 has a selectable output inversion function provided by the Exclusive Or gate 424. The output of the OR gate array 444 has a selectable output inversion function provided by the Exclusive Or gate 444. The Exclusive Or gates 424, 444 are used to implement NAND and NOR functions.

The AND and OR logic states are combined using the final OR gate 428. At this point the combinatorial logic stage is complete. A CMBx signal 430 (where x=0 to 31) appears at the output terminal of the I/O system module.

Each CMBx signal 430 may also be routed to a shift register, a pulse circuit, a direct channel to the physical output, or a latch circuit, as described in connection with FIG. 6 herein below. A CMBx output may also be directed to drive an internal counter.

The output signal at terminal 430 may be fed to a counter 450 which then drives a display 452.

If no inputs are enabled for the AND array then the AND master invert (424) is set to invert. If no inputs are enabled for the OR array, then the OR master invert (444) is disabled.

Default definitions for external I/O points require that all I/O points including the SHF CLKs and the RJ VERs may also be used as general purpose inputs if they are not used for their default purpose. Their status is available in the input state array whether or not they are programmed to be an input or an output.

For a software implementation of the invention, each of the above events has an event handling routine that is called when the event occurs. This event handler will go to its own list which is made up at initialization time and which contains the vectors to each of the outputs to be updated. This list is made up at initialization time or whenever the configuration is performed in order to save time during execution.

In addition, with the exception of the 2 msec and 10 msec clocks, the external clocking signals to the input latch clear the latch on the off phase trailing edge (or) the unspecified edge.

Figure 5:
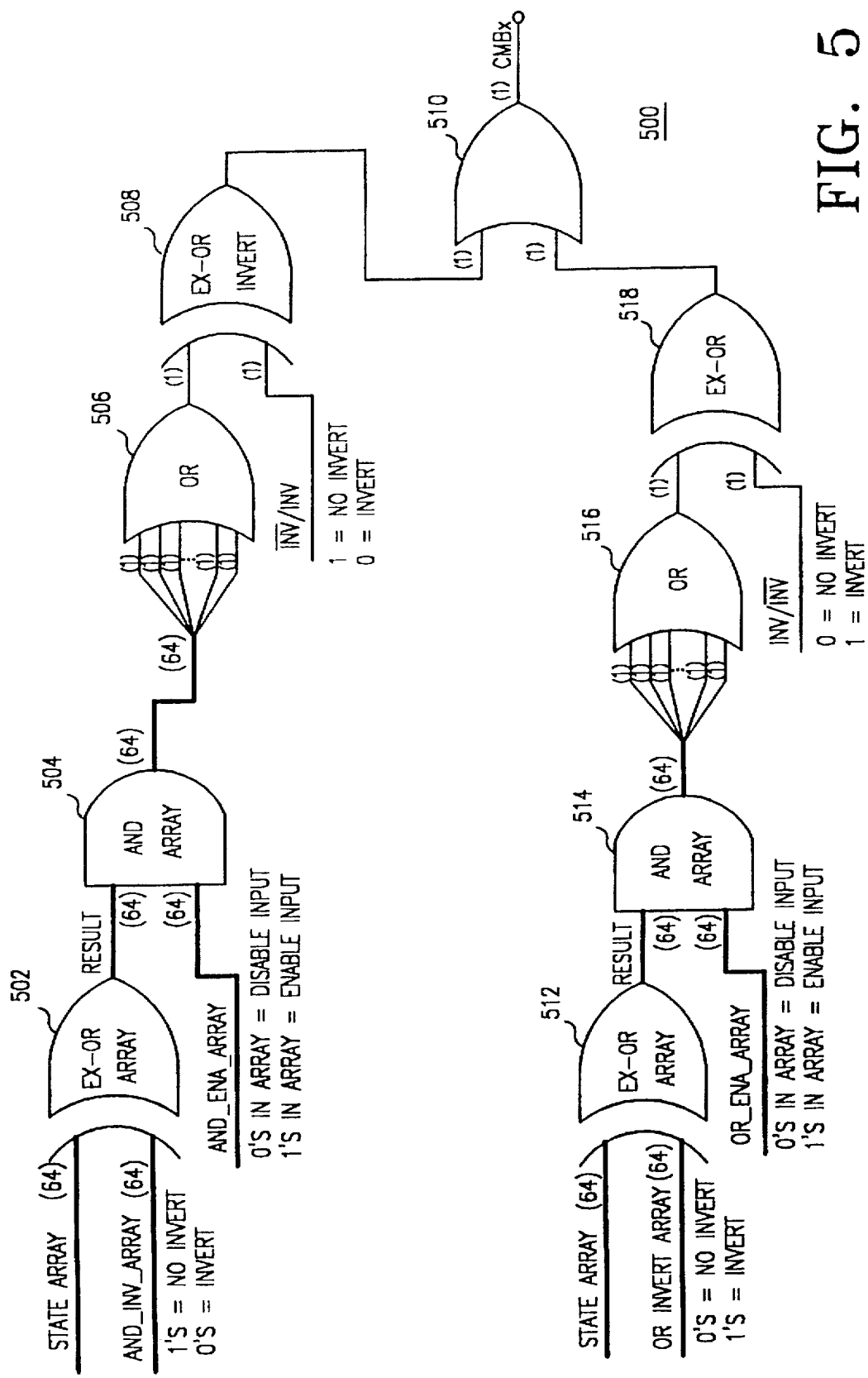
FIG. 5 is a diagram illustrating AND and OR combinatorial functions of a configurable I/O system according to the invention.

FIG. 5 illustrates the AND and OR combinatorial functions simulated for a configurable I/O system according to the invention. The And/Or Logic 500 is provided, for example, as a software simulation of a programmable multilevel array of AND/OR gates so that outputs are specified as a logical function of the inputs. The input state variables which are acted upon by the functional logic block include externally generated signals, program generated outputs, counter states, shift register states, and latch states. For each of an array of outputs, there can be a separate logic equation based on the input state variables.

FIG. 5 shows the 64 elements of the input state array are combined with respective 64 elements of the inverter AND-INV-ARRAY in an Exclusive-Or Array 502. The 64 elements of the Exclusive-Or Array 502 are combined with respective 64 elements of the enable AND-ENA_ARRAY in an AND array 504. The 64 individual elements of the AND array 504 are combined together in an OR function 506 to provide a single output element, which is combined in another Exclusive-Or function 508 with the INV/*INV control signal. A "0" value for the INV/*INV control signal inverts the AND function to a NAND function. The output of the Exclusive-Or function 508 is one input to an output OR gate 510 which provides a CMBx output signal.

Similarly, FIG. 5 also shows the 64 elements of the input state array are combined with respective 64 elements of the inverter OR-INV-ARRAY in an Exclusive-Or Array 522. The 64 elements of the Exclusive-Or Array 512 are combined with respective 64 elements of the enable OR-ENA_ARRAY in an AND array 514. The 64 individual elements of the AND array 514 are combined together in an OR function 516 to provide a single output element, which is combined in another Exclusive-Or function 518 with the INV/*INV control signal. A "1" value for the INV/*INV control signal inverts the OR function to a NOR function. The output of the Exclusive-Or function 518 is the other input to the output OR gate 510 which provides the CMBx output signal.

Note that the AND_INV_ARRAY inverts if a 0 is present, while the OR INV_ARRAY inverts if a 1 is present.

An example of an externally generated input signal is a presence sensor which outputs a logic 1 whenever a package is in front of an infrared beam of light.

An example of an internally generated state variable comes from a consecutive error counter which increments once for each time a package passes the presence sensor without the label on the package being decoded. When the counter reaches a programmed limit value, it latches a state variable to a 1. This state variable can then be used by the combinatorial logic to set or clear output signals on the machine, such as a machine-stop signal.

With reference to FIGS. 4A–B, the combinatorial logic contains two arrays of gates, the AND array and OR array. The state variables are input to each logic array. For each input there are also two programmable variables, the ENABLE and the INVERT.

The complete equation for a CMBx output (x=i) at terminal 430 of FIGS. 4A–B is:

output($i$)430 = Invert(AND_result[$i$]422 $\oplus$ $\overline{\text{AND\_total\_invert}[i]}$ 424) +

(OR_result[$i$]422 $\oplus$ OR_total_invert[$i$]444), where:

AND_result[$i$]422 = $\sum_{j=1}^{j=M}$ (input($j$)406 $\oplus$ $\overline{\text{AND\_invert}(i,j)414}$) ·

AND_enable($i,j$)418 and

OR_result($i$)442 =

$\sum_{j=1}^{j=M}$ (input($j$)406 $\oplus$ OR_invert($i,j$)434) · OR_enable($i,j$)438

The following symbols are provided as follows: $\oplus$ means the EXCLUSIVE OR operation; $\overline{\oplus}$ means Exclusive NOR operation; ● means the AND function; + means the OR function, and $$\sum_{j=1}^{j=M}$$

is a summation for a number of terms.

There are M input state variables, designated input(j)406. There are multiple output signals designated output(i)430.

For each input in each output equation there is an inversion for the input, in both the AND array designated And_invert (i,j)424. For each input in each output equation there is an inversion variable, designated OR_invert(i,j), for the input in both of the OR arrays. For each input in each output equation there is an enable variable, designated And_enable (i,j), for the inputs in both of the AND arrays. For each input in each output equation there is an enable, designated OR_enable(i,j), for the inputs in both of the OR array. For each output, there is an inversion variable, designated And_ total_invert(i), to change the AND equation to a NAND equation. For each output, there is an inversion variable, designated OR_total_invert(i), to change the OR equation to a NOR equation.

An event will trigger the calculation of the output states for one or more outputs. For example, if an event triggers the calculation of output(5), then the above equations are executed with i=5.

Figure 6:
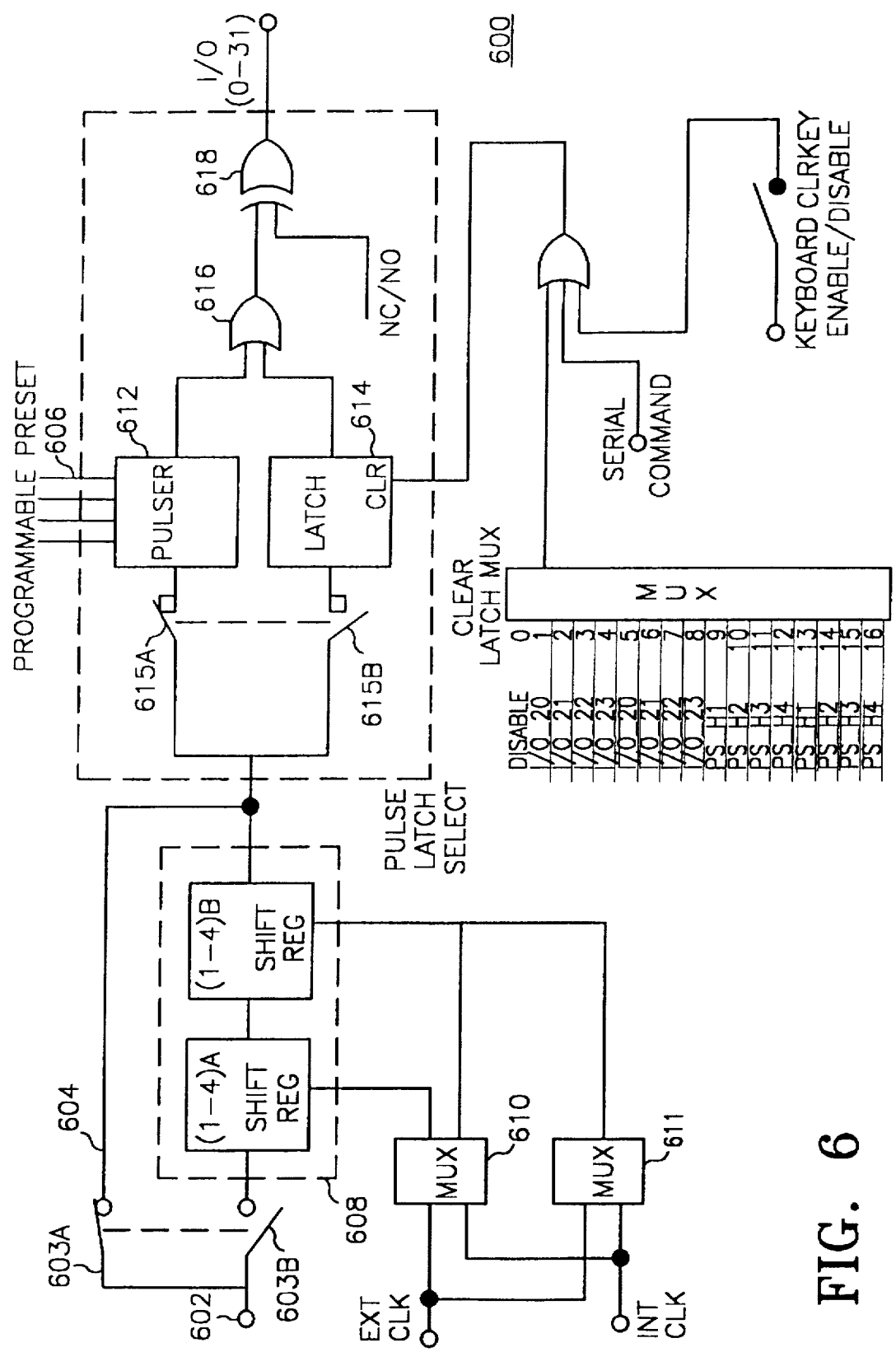
FIG. 6 is a block diagram of an output conditioner circuit for a configurable I/O according to the invention.

FIG. 6 shows a functional block diagram of an output conditioner module 600 which receives at input terminal 602 the output signal CMBx, where CMBx is provided from terminal 430 of the combinatorial logic phase of the I/O system module of FIGS. 4A–B. The signal at input terminal 602 is routed using mutually exclusive switches 603a, 603b either directly through a signal line 604 to an output conditioning module 606 or, alternatively, to an input terminal of a shift register module 608. Four register modules are available so that up to 8 shift registers are available either singly or paired as 1A to 1B, 2A to 2B, etc. Each module can be assigned to any of the CMBx outputs.

Either one or two shifters can be put into any of the output streams. If the shift register value is non-zero it will caused a shift operation, otherwise the signal goes directly thru to the next module.

The clock input to the shift registers comes through multiplexers 610, 611 that allows for separate selection of a clock input, in the same manner as the clock inputs to the combinatorial latch. This provides internal clock pulses or external inputs including the presence inputs.

Reject/Verify test blocks are related to any of the I/O points. Thus, when an output signal CMBx propagates through to the I/O points, the reject/verify test block is initiated, if its timer is non-zero. The reject timer starts when the output is initiated. If the reject timer expires before a transition is detected on the verify input, the RJ_VF_(X) state bit in the input state register will be asserted. The bit is cleared during the next slow periodic update cycle guaranteeing that an I/O point will capture the state change.

In addition, the outputs of the combinatorial phase CMB00–CMB31 are available through a multiplexer to clock any of six configurable event counters.

The remainder of the output conditioner module includes an output conditioner submodule which contains a pulse output timer 612 and a latch 614. The inputs to the timer 612 or the latch 614 are obtained using mutually exclusive switches 615a,a 615b. Operations of the pulse output timer and the latch are mutually exclusive so that when the pulse output is selected, the latch is de-selected and vice-versa.

The pulse output timer module 612, or pulser, provides a pulse output with a programmable duration. A pulse output is retriggerable. If a new trigger arrives before the pulse is complete, the pulser timeout is restarted and the pulse continues. If the pulser is set to zero, then the pulser module acts like a short and passes the state of the signal to the output circuit. Otherwise, a pulse always starts on a transition from a 0 to a 1. The pulse timer is programmable from 2 msec to 2 seconds.

The latch 614 is always triggered from an input which goes from a 0 to a 1 state. When the latch output occurs, the output level remains until the latch is cleared. The signal that clears the latch is selected with a multiplexer similar to the clock selector for the input latch. Signals that clear the latch are: keyboard input, serial command, and selected external inputs. The latch also has an enable bit which can cause the name of the output to be written to a display and also to a serial port. The display is locked until cleared by the keypad. This allows alarm messages to be displayed.

After a signal exits the latch or pulser, it is fed to a two-input OR gate 616. The output of the OR gate is fed to on input of an EXCLUSIVE-OR gate 618. The other input terminal of the gate 618 receives a NC/NO signal which determines whether the final I/O output I/O (00–31) at terminal is NORMALLY OPEN OR NORMALLY CLOSED. (which refers to the final relay output). The output terminal is then directly connected to a physical output device.

The output at terminal 430 is also available to the input latch. This allows logic circuits to be chained as well as to create circuits such as oscillators.

The PMC80 Series of printed-matter controllers includes four sets of counters 452 for each of the four bar code scanner. An additional 2 sets of 4 counters are available, of which 6 can be mapped to combinatorial outputs of modules. The first 3 counters in each group of four perform specific counting tasks while the fourth counter is used for totals and is incremented each time one of the other three counters is incremented. Whenever these additional sets of counters are enabled, a display program shows these counters and a printout routines prints these counters. A 10 char modifiable name is available for the counters which are identified as G, N, W, A, B, C, D, E, F, and T.

TABLE I shows the values of various control signals which are set during initialization of the system to obtain a specific I/O configuration.

TABLE I

;Application = Sample
;Output Bit Function = Latch, WC_H1, Shft Reg 3A (6)
;Output Bit # = 01
;
01                ; clock source 00–17 (00=dis)
0                 ; counter 0–6 (0=dis)
6                 ; shifter 0–8 (0=dis) L=link
00                ; shifter clock 00–14 (00=dis)
0                 ; Rej Ver Timer 0–8 (0=none)
0                 ; master AND invert
0                 ; master OR invert
;

TABLE I-continued

| ;AND_INV | OR_INV | AND_EN | OR_EN | | |
|---|---|---|---|---|---|
| 0 | 0 | 0 | 0 | ; | good read head 1 |
| 0 | 0 | 0 | 0 | ; | good read head 2 |
| 0 | 0 | 0 | 0 | ; | good read head 3 |
| 0 | 0 | 0 | 0 | ; | good read head 4 |
| 0 | 0 | 0 | 0 | ; | no read head 1 |
| 0 | 0 | 0 | 0 | ; | no read head 2 |
| 0 | 0 | 0 | 0 | ; | no read head 3 |
| 0 | 0 | 0 | 0 | ; | no read head 4 |
| 0 | 0 | 1 | 0 | ; | wrong read head 1 |
| 0 | 0 | 0 | 0 | ; | wrong read head 2 |
| 0 | 0 | 0 | 0 | ; | wrong read head 3 |
| 0 | 0 | 0 | 0 | ; | wrong read head 4 |
| 0 | 0 | 0 | 0 | ; | cer head 1 |
| 0 | 0 | 0 | 0 | ; | cer head 2 |
| 0 | 0 | 0 | 0 | ; | cer head 3 |
| 0 | 0 | 0 | 0 | ; | cer head 4 |
| 0 | 0 | 0 | 0 | ; | rjvf1a |
| 0 | 0 | 0 | 0 | ; | rjvf1b |
| 0 | 0 | 0 | 0 | ; | rjvf2a |
| 0 | 0 | 0 | 0 | ; | rjvf2b |
| 0 | 0 | 0 | 0 | ; | rjvf3a |
| 0 | 0 | 0 | 0 | ; | rjvf3b |
| 0 | 0 | 0 | 0 | ; | rjvf4a |
| 0 | 0 | 0 | 0 | ; | rjvf4b |
| 0 | 0 | 0 | 0 | ; | head 1 disabled |
| 0 | 0 | 0 | 0 | ; | head 2 disabled |
| 0 | 0 | 0 | 0 | ; | head 3 disabled |
| 0 | 0 | 0 | 0 | ; | head 4 disabled |
| 0 | 0 | 0 | 0 | ; | no ps h1 |
| 0 | 0 | 0 | 0 | ; | no ps h2 |
| 0 | 0 | 0 | 0 | ; | no ps h3 |
| 0 | 0 | 0 | 0 | ; | no ps h4 |
| 0 | 0 | 0 | 0 | ; | i/o 00 |
| 0 | 0 | 0 | 0 | ; | i/o 01 |
| 0 | 0 | 0 | 0 | ; | i/o 02 |
| 0 | 0 | 0 | 0 | ; | i/o 03 |
| 0 | 0 | 0 | 0 | ; | i/o 04 |
| 0 | 0 | 0 | 0 | ; | i/o 05 |
| 0 | 0 | 0 | 0 | ; | i/o 06 |
| 0 | 0 | 0 | 0 | ; | i/o 07 |
| 0 | 0 | 0 | 0 | ; | i/o 08 |
| 0 | 0 | 0 | 0 | ; | i/o 09 |
| 0 | 0 | 0 | 0 | ; | i/o 10 |
| 0 | 0 | 0 | 0 | ; | i/o 11 |
| 0 | 0 | 0 | 0 | ; | i/o 12 |
| 0 | 0 | 0 | 0 | ; | i/o 13 |
| 0 | 0 | 0 | 0 | ; | i/o 14 |
| 0 | 0 | 0 | 0 | ; | i/o 15 |
| 0 | 0 | 0 | 0 | ; | i/o 16 |
| 0 | 0 | 0 | 0 | ; | i/o 17 |
| 0 | 0 | 0 | 0 | ; | i/o 18 |
| 0 | 0 | 0 | 0 | ; | i/o 19 |
| 0 | 0 | 0 | 0 | ; | i/o 20 |
| 0 | 0 | 0 | 0 | ; | i/o 21 |
| 0 | 0 | 0 | 0 | ; | i/o 22 |
| 0 | 0 | 0 | 0 | ; | i/o 23 |
| 0 | 0 | 0 | 0 | ; | i/o 24 |
| 0 | 0 | 0 | 0 | ; | i/o 25 |
| 0 | 0 | 0 | 0 | ; | i/o 26 |
| 0 | 0 | 0 | 0 | ; | i/o 27 |
| 0 | 0 | 0 | 0 | ; | i/o 28 |
| 0 | 0 | 0 | 0 | ; | i/o 29 |
| 0 | 0 | 0 | 0 | ; | i/o 30 |
| 0 | 0 | 0 | 0 | ; | i/o 31 |
| WCH1 | | | ; | | Output name (max length 10) |
| NO | | | ; | | NO or NC |
| Latch | | | ; | | Latch |
| Enable | | | ; | | Latch display flag Enable/Disable |
| Enable | | | ; | | Latch clear by keyboard Enable/Disable |
| 00 | | | ; | | Latch clear selection 00–16 (00-no clear) |

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A configurable I/O system, comprising:
   an input state array having a plurality of state variables representing input values;
   a logic function means for operating on the plurality of state variables and for providing a logic output signal;
   trigger means having a plurality of trigger functions for synchronizing operation of the logic function means with a trigger event;
   wherein the trigger means includes a multiplexing means for selecting the trigger event;
   wherein the trigger means further includes functional dispatch means for placing a detected preselected input event in a circular event queue and for removing the detected preselected input event from the circular event queue;
   wherein the functional dispatch means includes mapping means for mapping the trigger event through a table to the logic means which includes combinatorial logic calculation routine and an initiation means for initiating execution of the combinatorial logic calculation routine; and
   wherein the logic function means for operating on the plurality of state variables and for providing a logic output signal includes means for executing a predetermined function in response to the detected preselected input event.

2. The configurable I/O system of claim 1 including an output signal conditioner for conditioning the logic output signal.

3. The configurable I/O system of claim 1 including means for initially configuring the logic function means.

4. The configurable I/O system of claim 1 wherein the trigger means includes means for detecting the preselected input event.

5. The configurable I/O system of claim 1 wherein the logic function means includes a software simulation of a programmable array.

6. The configurable I/O system of claim 5 wherein the programmable array is an array of AND gates and OR gates by means of which outputs can be specified as logical functions of the inputs.

7. The configurable I/O system of claim 1 wherein the input values are state variables which consist of external signals, internally generated signals, counter states, shift register states, and latch states.

8. The configurable I/O system of claim 7 wherein the external signals include a signal which is generated from a presence sensor.

9. The configurable I/O system of claim 8 wherein the signal which is generated from the presence sensor includes a signal generated when an item is in front of an infrared light beam.

10. The configurable I/O system of claim 7 wherein the internally generated signals are internally generated state variables which are provided by a consecutive error counter.

11. A configurable I/O system, comprising
   an input state array for receiving a plurality of input signals and having a plurality of elements where each element respectively corresponds to one of said input signals;
   a latch array having elements for receiving and storing the states of the respective elements of the input state array;
   means for controlling a clock signal provided to the latch array to synchronize operation of an system with the occurrence of the clock signal;
   a multi-input AND array;
   an AND inverter array having elements for receiving and selectively inverting the elements of the latch means;
   an AND input selection array for selectively directing a corresponding bit from the AND inverter array into one of the inputs of the multi-input AND array;
   an AND output inverter for selectably inverting the output of the multi-input AND array;
   a multi-input OR array;
   an OR inverter array having elements for receiving and selectively inverting the elements of the latch means;
   an OR input selection array for directing a corresponding bit from the OR inverter array into one of the inputs of the multi-input OR array;
   an OR output inverter for selectably inverting the output of the multi-input OR array;
   an OR gate for combining the outputs of the AND output inverter and the OR output inverter; and
   an output means for outputting the output signal signals for the OR gate.

12. A configurable I/O system, comprising
   an input state array having input state variables acted upon by logic functional block arrays;
   a first Exclusive OR array for logically combining each respective element of the input state array with the respective elements of an AND invert array;
   a first AND array for logically combining each respective elements of the first Exclusive OR array with each respective elements of an And enable array;
   a first OR array for logically combining the respective elements of the AND array into a single element;
   a first Exclusive-OR invert Array for combining the single element of the OR array with an invert command signal to selectably provide an inverted or non-inverted AND output signal;
   a second Exclusive OR array for logically combining each respective element of the input state array with the respective elements of an OR Invert array;
   a second AND array for logically combining respective elements of the second Exclusive OR array with respective elements of an OR enable array;
   a second OR array for logically combining the respective elements of the second AND array into a single element;
   a second Exclusive-OR invert Array for combining the single element of the OR array with an invert command signal to selectably provide an inverted or non-inverted OR output signal and;
   an output OR function for logically combining the inverted or non-inverted AND output signal with the inverted or non-inverted OR output signal to provide an output signal.

13. The configurable I/O system of claim 12 including an output signal conditioner for the output signal which alternatively provides a direct channel to an output terminal, shift registers, a pulse circuit, and a latch circuit.

14. The configurable I/O system of claim 12 wherein the output signal is provided to a counter.

* * * * *